(12) United States Patent
Pratte et al.

(10) Patent No.: US 11,214,019 B2
(45) Date of Patent: Jan. 4, 2022

(54) SURFACE ENGINEERING OF THERMOPLASTIC MATERIALS AND TOOLING

(71) Applicant: Cytec Industries Inc., Woodland Park, NJ (US)

(72) Inventors: James Francis Pratte, Wilmington, DE (US); Scott Alfred Rogers, Placentia, CA (US)

( * ) Notice: Subject to any disclaimer, the term of this patent is extended or adjusted under 35 U.S.C. 154(b) by 857 days.

(21) Appl. No.: 15/045,650

(22) Filed: Feb. 17, 2016

(65) Prior Publication Data
US 2016/0221223 A1 Aug. 4, 2016

Related U.S. Application Data

(62) Division of application No. 14/057,254, filed on Oct. 18, 2013.
(Continued)

(51) Int. Cl.
*B29C 70/38* (2006.01)
*B29C 33/42* (2006.01)
(Continued)

(52) U.S. Cl.
CPC ............. *B29C 70/386* (2013.01); *B05D 1/10* (2013.01); *B29B 15/105* (2013.01); *B29C 33/3842* (2013.01); *B29C 33/42* (2013.01); *B29C 33/56* (2013.01); *B29C 33/62* (2013.01); *B29C 33/68* (2013.01); *B29C 37/0075* (2013.01);
(Continued)

(58) Field of Classification Search
CPC ...... B29C 70/38; B29C 70/386; B29C 70/388; B29C 33/68; B29C 33/3842; B29C 33/42; B29C 33/424; B32B 7/12; B32B 37/12; B32B 37/24; B32B 2037/1267;
(Continued)

(56) References Cited

U.S. PATENT DOCUMENTS

| | | |
|---|---|---|
| 4,132,755 A | 1/1979 | Johnson |
| 4,549,920 A | 10/1985 | Cogswell et al. |

(Continued)

FOREIGN PATENT DOCUMENTS

| | | |
|---|---|---|
| CN | 102548739 A | 7/2012 |
| EP | 1479452 B1 | 7/2006 |

(Continued)

*Primary Examiner* — Atul P. Khare
(74) *Attorney, Agent, or Firm* — Thi Dang

(57) ABSTRACT

A prepared mold tool having a thermoplastic surface layer polymer coating on the mold surface of the mold tool or prepared prepreg having a thermoplastic surface layer polymer coating on the surface of the thermoplastic fiber reinforced prepreg are described that enhance first ply laydown of thermoplastic fiber reinforced composite prepregs onto mold tools for prepreg forming or in situ tape placement. Resulting thermoplastic fiber reinforced composite parts from a thermoplastic fiber reinforced thermoplastic composite material having structural reinforcement fibers with one or more high performance polymers, and a thermoplastic surface layer polymer coating which forms a polymer blend with the high performance polymers of the thermoplastic fiber reinforced composite material thereby imparting improved properties, and methods for making and using same, are provided herein.

5 Claims, 6 Drawing Sheets

Related U.S. Application Data

(60) Provisional application No. 61/715,438, filed on Oct. 18, 2012.

(51) Int. Cl.

| | | |
|---|---|---|
| *B32B 7/03* | (2019.01) | |
| *B29C 37/00* | (2006.01) | |
| *B29C 70/08* | (2006.01) | |
| *B29C 33/56* | (2006.01) | |
| *B32B 38/00* | (2006.01) | |
| *B05D 1/10* | (2006.01) | |
| *B29B 15/10* | (2006.01) | |
| *B29C 33/38* | (2006.01) | |
| *B29C 33/62* | (2006.01) | |
| *B29C 33/68* | (2006.01) | |
| *B32B 7/12* | (2006.01) | |
| *B32B 37/26* | (2006.01) | |
| *B29K 71/00* | (2006.01) | |
| *B29K 79/00* | (2006.01) | |
| *B29K 101/12* | (2006.01) | |
| *B29K 105/08* | (2006.01) | |

(52) U.S. Cl.
CPC ............. *B29C 70/086* (2013.01); *B32B 7/03* (2019.01); *B32B 38/0008* (2013.01); *B29K 2071/00* (2013.01); *B29K 2079/085* (2013.01); *B29K 2101/12* (2013.01); *B29K 2105/0881* (2013.01); *B32B 2037/268* (2013.01); *Y10T 428/31935* (2015.04)

(58) Field of Classification Search
CPC .......... B32B 2037/243; B32B 38/0008; B32B 2037/1269
See application file for complete search history.

(56) References Cited

U.S. PATENT DOCUMENTS

| | | | |
|---|---|---|---|
| 4,559,262 A | 12/1985 | Cogswell et al. | |
| 4,792,481 A | 12/1988 | O'Connor et al. | |
| 4,883,552 A | 11/1989 | O'Connor et al. | |
| 5,094,883 A | 3/1992 | Muzzy et al. | |
| 5,589,249 A * | 12/1996 | Bodford | A41D 31/02 |
| | | | 156/167 |
| 5,721,034 A | 2/1998 | Seemann, III et al. | |
| 5,725,710 A | 3/1998 | Pfeiffer et al. | |
| 5,789,073 A * | 8/1998 | Odagiri | C08J 5/24 |
| | | | 428/297.4 |
| 5,840,347 A | 11/1998 | Muramatsu et al. | |
| 6,027,794 A * | 2/2000 | Ozaki | C08J 5/24 |
| | | | 428/293.1 |
| 6,174,405 B1 * | 1/2001 | Clarke | B32B 37/04 |
| | | | 156/230 |
| 6,301,821 B1 | 10/2001 | Suzue et al. | |
| 6,372,294 B1 | 4/2002 | Vodermayer et al. | |
| 6,974,606 B2 * | 12/2005 | DiMarzio | B29C 37/0067 |
| | | | 427/314 |
| 8,158,245 B2 * | 4/2012 | Pratte | B29C 70/086 |
| | | | 428/300.7 |
| 2001/0005666 A1 | 6/2001 | Joslyn et al. | |
| 2005/0019501 A1 | 1/2005 | DiMarzio et al. | |
| 2005/0181181 A1 | 8/2005 | DiMarzio et al. | |
| 2010/0183761 A1 * | 7/2010 | Iwami | B29C 33/02 |
| | | | 425/547 |
| 2011/0097575 A1 | 4/2011 | Pratte et al. | |
| 2012/0028036 A1 * | 2/2012 | Bertelo | C08L 71/00 |
| | | | 428/332 |
| 2013/0052897 A1 * | 2/2013 | Rogers | B32B 27/12 |
| | | | 442/58 |
| 2013/0056150 A1 | 3/2013 | Cano Cediel et al. | |
| 2013/0056450 A1 | 3/2013 | Lissotschenko et al. | |

FOREIGN PATENT DOCUMENTS

| | | | | |
|---|---|---|---|---|
| EP | 1479516 B1 | | 5/2007 | |
| GB | 1392920 A | | 5/1975 | |
| GB | 1596793 A | * | 8/1981 | .......... B29C 70/386 |
| JP | 872157 A | | 3/1996 | |
| JP | 8258165 A | | 10/1996 | |
| SU | 706030 A3 | | 12/1979 | |
| WO | 2005033393 A1 | | 4/2005 | |
| WO | 2011038065 | | 3/2011 | |
| WO | 2011135132 A1 | | 3/2011 | |

* cited by examiner

RSm – Mean Spacing of Local Peaks of Profile
S is the mean spacing of adjacent local peaks at the profile within sampling length Formula 1

$R_y$ is the sum of height of $R_p$ of the highest profile peak from the mean line and depth $R_v$ of the deepest profile valley from the mean line within sampling length Formula 2

SURFACE ENGINEERING OF THERMOPLASTIC MATERIALS AND TOOLING

This application is a divisional application of U.S. application Ser. No. 14/057,254 filed on Oc. 18, 2013, which claims the benefit of prior U.S. Provisional Application No. 61/715,438 filed on Oct. 18, 2012, both of which are incorporated herein by reference.

BACKGROUND OF THE INVENTION

Field of the Invention

The subject matter of the present invention relates to fiber reinforced thermoplastic plastic composite materials and particularly to applying a surface layer polymer coating to a composite forming mold tool or to a fiber reinforced thermoplastic prepreg composite material to enhance the first ply laydown of the prepreg onto the composite forming mold tool for prepreg forming or in situ automated laydown tape placement. In situ application of the surface layer polymer coating during or before automated laydown may also provide a beneficial resin rich interlaminar layer between each layer of fiber reinforced thermoplastic composite material. The surface layer polymer coating is preferably thermoplastic particles applied by plasma spraying to the mold tool or prepreg to form a substantially fused layer of thermoplastic particles. More particularly, in certain embodiments the present invention relates to layered fiber reinforced thermoplastic prepreg for use in rapid lamination and forming processes where such fiber reinforced thermoplastic prepreg are useful in aerospace and other high-performance automotive/industrial applications.

Description of the Related Art

Reinforced thermoplastic and thermoset materials have wide application in, for example, the aerospace, automotive, industrial/chemical, and sporting goods industries. Thermosetting resins are impregnated into the fiber reinforcing material before curing, while the resinous materials are low in viscosity. Thermoset composites suffer from disadvantages including processing problems concerned with removing entrained air or volatiles an that a void-free matrix is produced. Thermoset composites made by the prepreg method require lengthy cure times with alternating pressures to control the flow of the resin as it cures to prevent bubbles in the matrix. While traditional fabrication of structures utilized hand placement of thermosetting prepreg plies onto a tool, current fabrication of large structures utilize robotic placement of the thermoset composite material onto the tool to increase production rate. The overall production rate for a structural component is limited by the lengthy cure in the autoclave process step and related operations to prepare the material for that process step. Some high volume processes, such as resin infusion avoid the prepreg step but still require special equipment and materials along with constant monitoring of the process over the length of the cure time (e.g., U.S. Pat. Nos. 4,132,755, and 5,721,034).

Thermoplastic resin compositions are more difficult to impregnate into the fiber reinforcing material because of their comparatively higher viscosity than thermosetting resin compositions. On the other hand, thermoplastic resin compositions offer a number of benefits over thermosetting resin compositions. For example, thermoplastic prepregs can be more rapidly fabricated into articles and fabrication with fiber reinforced thermoplastic composite materials may utilize robotic automated laydown tape placement of the fiber reinforced thermoplastic composite material onto a mold tool to increase production rate. This may be through a multiple-step robotic arm that pre-heats the prior layer of fiber reinforced thermoplastic composite material before heating and laying the subsequent layer of fiber reinforced thermoplastic composite material on top of it.

Thermoplastic resins are long chain polymers f high molecular weight that are highly viscous when melted and are often non-Newtonian in their flow behavior. Thus, whereas thermosets have viscosities in the range of 100 to 5,000 centipoise (0.1 to 5 Pa*s), thermoplastics have melt viscosities ranging from 5,000 to 20,000,000 centipoise (5 to 20,000 Pa*s), and more typically from 20,000 to 1,000,000 centipoise (20 to 1000 Pa*s). Despite a viscosity difference of three orders of magnitude between thermosets and thermoplastics, some processes have been applied to both types of matrices for laminating fibrous materials.

Fiber reinforced plastic materials may be manufactured by first impregnating the fiber reinforcement with resin to form a prepreg, then consolidating two or more prepregs into a laminate, optionally with additional forming steps. A few processes apply melt directly to the fibers. A tape can be made by coating a dry web of collimated fibers with the polymer and applying a heated process that forces the polymer into and around the fibers (e.g., see U.S. Pat. Nos. 4,549,920 and 4,559,262). Another process used to coat and impregnate a dry web of collimated fibers is by pulling the web through an aqueous slurry of fine thermoplastic polymer particles whereby the polymer particles are trapped within the filament bundles. Subsequent heat and pressure in the process boils off the water and then melts the polymer to force it into and around the filament bundles. This process is described in U.S. Pat. Nos. 6,372,294, 5,725,710, 4,883,552 and 4,792,481. A modification to the aqueous slurry impregnation process is to eliminate the use of water and surfactant as dispersing agents for the polymer particles and instead electrostatically charge the particles in a fluidized bed of air to trap the particles in the filament bundle. Subsequent zones of heat and pressure melt the polymer to coat/impregnate the filament bundle as given in U.S. Pat, No. 5,094,883. Thus, for those skilled in the art, there are multiple methods to coat and/or impregnate a fibrous substrate given the available process equipment, and proper selection of polymer product form (flake, fine powder, film, non-woven veil, pellets) and melt viscosity.

Both thermoplastic and thermoset composites can be formed into thin flexible sheets or strips, referred to as tape. This allows composite components to be formed by laying down the composite tape in a molding tool, with the thickness of the component being locally varied according to the number of layers of composite tape laid down and also the direction of one or more layers of the tape being controllable so as to control the final structural properties of the formed composite component. The laid up components are then "consolidated", a process which cases involves heating the composite structure so that the thermoset or thermoplastic matrix softens to a sufficient degree to form a single unified matrix, and applying sufficient pressure to the softened matrix to expel any trapped air from the matrix.

In terms of final structural properties, thermoplastic composites have superior impact and damage resistance properties to those of thermoset composites and are generally tougher and more resistant to chemical attack, all of which are preferable properties within aerospace applications. Furthermore, since thermoplastic composites may be repeatedly reheated and remolded, they are inherently recyclable, which is an increasingly important consideration.

However, thermoset composite tape has one property that, in relation to the laying up process, currently makes it the material of choice for use in aerospace composite components. This property is that the thermoset tape is inherently sticky, or is said to have tack. This tackiness allows the thermoset tape to adhere to both the complex shaped mold surfaces often required for composite components within the aerospace industry, and also for separate layers of the thermoset tape to adhere to one another once the initial layer has been applied to the mold surface, thus making the laying up process relatively easy and convenient to physically manage.

In contrast, thermoplastic composite tape has no tackiness. Consequently, it is problematic to make the thermoplastic composite tape adhere to complex mold surfaces during the lay-up process. Existing lay-up techniques combine local consolidation and melting of he thermoplastic composite material to enable the initial, base layer to be built up only as long as the base layer is firmly held to the surface of the mold tool. Previously proposed solutions to this problem have included applying a separate double-sided adhesive tape as an initial layer to the mold surface to which the first layer of thermoplastic composite tape subsequently adheres. Similarly, it has also been proposed to spray an adhesive to the surface of the mold. Whilst both proposed solutions allow the first layer of thermoplastic composite tape to be successfully applied to complex shaped mold surfaces, they introduce their own problem of how to subsequently remove the formed composite component from the mold when the laying up process is complete, since the component is now effectively bonded to the mold surface. Consequently, it is still presently preferred to use thermoset composite materials despite the superior physical properties provided by thermoplastic composite materials.

Known methods for fabrication of composite articles include manual and automated fabrication. Manual fabrication entails manual cutting and placement of material by a technician to a surface of the mandrel. This method of fabrication is time consuming and cost intensive, and can possibly result in non-uniformity in the lay-up.

Automated fabrication techniques include flat tape laminating machines (FTLM) and contour tape laminating machines (CTLM). Typically, both FTLM and CTLM employ a solitary composite material dispenser that travels over the work surface onto which the composite material is to be applied. The composite material is typically laid down a single row (of composite material) at a time to create a layer of a desired width and length. Additional layers may thereafter be built up onto a prior layer to provide the lay-up with a desired thickness. FTLM's typically apply composite material to a flat transfer sheet; the transfer sheet and lay-up are subsequently removed from the FTLM and placed onto a tool, mold or mandrel. In contrast, CTLM's typically apply composite material directly to the work surface of a tool, mold or mandrel. FTLM and CTLM machines are also known as automated tape laydown (ATL) and automated fiber placement (AFP) machines, with the dispenser commonly referred to as a tape head.

The productivity of ATL/AFP machines is dependent on machine parameters, composite part lay-up features, and material characteristics. Machine parameters such as start/stop time, course transition time, and cut/adding plies determine the total time the tape head on the ATL/AFP is laying material on the mandrel. Composite lay-up features such as localized ply build-ups and part dimensions also influence the total productivity of the ATL/AFP machines.

The ideal process for creating thermoplastic parts is in situ fabrication wherein a part is created by robotically placing and consolidating thermoplastic materials onto the molding tool in one step. Thermoplastic composite materials lack tack, which complicates the use of hand and automated lay-up operations, especially of the first ply against the molding tool surface.

Key material factors that influence ATL/AFP machine productivity are similar for a thermoset resin matrix composite when compared with a thermoplastic matrix composite yet there are a couple of key differences. For thermoset resin matrix composites, key factors are impregnation levels, surface resin coverage, and "tack". Tack is the adhesion level necessary to maintain the position of the tape/tow on the tool or lay-up after it has been deposited on it. Due to the unreacted nature of the thermoset resin, the ATL/AFP process is generally performed at room temperature but in humidity controlled rooms due to the moisture sensitivity on the tack level of the material. Among other impacts, tack affects the ability to lay down the first ply of material onto the tool. First ply lay-down of thermoplastic materials is complicated by the lack of tack to hold the first layer down to the tool.

The first composite ply to be placed against any tool requires some adhesive or other force to position the material and hold it against gravity or the stiffness of the material. When thermoset materials are used, the polymer that is above the $T_g$ at the lay-down head will provide this force. When the matrix resin is a high performance thermoplastic, this $T_g$ temperature is substantially higher and substantially above room temperature. Heating the mold tool, providing a vacuum source, use of a lower temperature film or using a solvated thermoplastic polymer to provide the restraining force are all methods currently used. Each of these methods has limitations in cost, tool complexity, variation to the dimensions of the part or requires hazardous solvents to practice.

A method known to overcome the limitation of low tack in thermoplastics manufacturing is to provide a mold tool made of a porous material and apply a negative pressure to the porous material so as to create a negative pressure at the mold surface, whereby the thermoplastic composite material is held against the mold surface by virtue of the negative pressure at the mold surface when the initial layer of thermoplastic composite material is laid onto the mold surface. The thermoplastic material could thereafter be consolidated and heated to form the thermoplastic composite material (see, e.g., U.S. Patent Application Publication No. 2011/0005666).

Thermoplastic matrix composites have similar key factors as thermoset matrix composites for ATL/AFP machine productivity, but the thermoplastics polymer tape lack tack at ambient conditions. Thermoplastics generally have low surface energies, a high glass transition temperature ("$T_g$"), making adhesion at room temperature unlikely. Furthermore, the high performance thermoplastic matrices are in their glass state at room temperature making the molecular diffusion mechanism for tack virtually impossible. Thus, tack is achieved in thermoplastic composites by dynamically applying additional energy in the form of thermal, ultrasonic, optical (laser), and/or electromagnetic (induction) to the lay-up and incoming tape to raise the temperature of the materials above their softening and/or melt temperature in order to facilitate molecular diffusion of the polymer chains to occur between the two surfaces. Once the polymer chains have diffused across the surface, the additional energy added to the materials needs to he removed to a level that will prevent distortion of the laminated lay-up once the lamination pressure from the ATL/AFP head is removed. This rapid flux of energy into and out of the lay-up makes it desirable from an energy usage and lay down speed to perform this process step at the lowest possible temperature and energy without compromising on the temperature performance of the resulting composite part.

Consolidation is typically necessary to remove voids that result from the inability of the resin to fully displace air from the fiber bundle, tow, or roving during the processes that have been used to impregnate the fibers with resin. The individually impregnated roving yarns, tows, plies, or layers of prepregs are usually consolidated by heat and pressure by compacting in an autoclave. The consolidation step has generally required the application of very high pressures and high temperatures under vacuum for relatively long times. Furthermore, the consolidation process step using an autoclave or oven requires a "bagging" operation to provide the lay-up with a sealed membrane over the tool to allow a vacuum to be applied for removal of air and to provide the pressure differential necessary to effect consolidation in the autoclave. This process step further reduces the total productivity of the composite part operation. Thus, for a thermoplastic composite it would be advantageous to in-situ consolidate to a low void composite while laminating the tape to the substrate with the ATL/AFP machine. This process is typically referred to as in situ ATL/AFP and the material used in that process called an in situ grade tape.

In general, thermoplastic composites have had limited success to date, due to a variety of factors including high processing temperatures (currently around 400° C.), high pressures, and prolonged molding times needed to produce good quality laminates. Most of the efforts have been focused on combining high performance polymers to structural fibers which has only exacerbated the process problems. Because the length of time typically required to properly consolidate the prepreg plies determines the production rate for the part, it would be desirable to achieve the best consolidation in the shortest amount of time. Moreover, lower consolidation pressures or temperatures and shorter consolidation times will result in a less expensive production process due to lowered consumption of energy per piece for molding and other manufacturing benefits.

Accordingly, the fiber-reinforced thermoplastic materials and methods presently available for producing light-weight, toughened composites require further improvement. Thermoplastic materials having improved process speeds on automated lay-up machines and lower processing temperatures and having no autoclave or oven step would be a useful advance in the art and could find rapid acceptance in the aerospace and high-performance automotive industries, among others.

SUMMARY OF THE INVENTION

The present invention provides a prepared mold tool having a releasably adhered surface layer polymer coating on the mold surface of the mold tool. The mold tool is a non-porous metal mold tool having a mold surface with a texture and a release film adhered to the textured mold surface of the mold tool and the surface layer polymer coating adhered to the release film. The surface layer polymer coating is preferably a plurality of thermoplastic particles applied to the mold surface by plasma spray creating a substantially fused layer of thermoplastic particles. The prepared mold tool aids placement and adhesion of the first ply of a fiber reinforced thermoplastic composite material such as a thermoplastic prepreg, a thermoplastic unidirectional tape or web, fiber tow/preg, or fabric, or non-woven materials such as a mat or veil. Thermoplastic prepregs are traditionally applied by hand laydown while thermoplastic unidirectional tapes are applied by in situ automated laydown tape placement against a mold tool.

The present invention also involves a method for preparing a prepared mold tool for first ply laydown by providing a solid metal, non-porous mold tool having a mold surface, applying a texture to a mold surface of the mold tool, applying a release film to the mold surface having a texture and finally applying a surface layer polymer coating by plasma spraying thermoplastic particles onto the release film on the mold surface of the mold tool having the texture.

A further embodiment of the present invention provides a prepared prepreg having fiber reinforced thermoplastic composite material with a surface layer polymer coating adhered to one or both surfaces of the composite material. The surface layer polymer coating is preferably a plurality of thermoplastic particles applied to the surface of the fiber reinforced thermoplastic composite materials by plasma spray to create a substantially fused layer of thermoplastic particles on the surface. The prepared prepreg aids placement of the first ply of fiber reinforced thermoplastic composite material to a mold surface of a mold tool and may further improve resulting composite part interlaminar properties between plies of composite material.

The present invention also involves a method for preparing the prepared prepreg by providing a fiber reinforced thermoplastic composite material such as a thermoplastic prepreg or a thermoplastic unidirectional tape and then applying a surface layer polymer coating by plasma spraying thermoplastic particles onto one or both of the surfaces of the fiber reinforced thermoplastic composite material.

In the present invention, the surface layer polymer coating provides a compatible chemistry placed against the mold tool which maintains the dimensions, lowers the temperature requirement for adhesion, and allows the use of hybrid polymer and optional inclusion of conductive coatings for lightning strike in the surface layer polymer coating. This compatible chemistry of the present invention improves adhesion of the first ply of fiber reinforced thermoplastic composite material to the mold surface of the mold tool while maintaining ease of separation of the resulting composite part from the mold tool. When the resulting composite part is removed from the mold tool, the surface layer polymer coating will transfer to the resulting composite part as a surface skin that may impart desirable characteristics to the resulting composite part. Such desirable characteristics such as fire, corrosion or wear protection may come from multi-functional additives to the surface layer polymer coating.

Of particular importance is where the surface layer polymer coating is a high performance thermoplastic such as poly(ether ether ketone) ("PEEK") or poly(ether ketone ketone) ("PEKK").

The present invention seeks to improve first-ply lay-down by reducing composite part failure due to material debonding against the mold tool during processing, as well as improving chemical compatibility in the high performance thermoplastic polymer. Concepts including fast crystallization or amorphous materials as well as discrete metallic layers and ground fiber mixtures are possible. Furthermore, this discovery also reduces the initial capital and facility cost investment to produce large composites.

The present invention also provides methods for manufacturing a resulting thermoplastic composite part with a thickness in the range of 25 to 400 microns that has improved processing times on ATE machines and manufacturing equipment.

Accordingly, the invention described in detail herein provides, in one aspect, a prepared mold tool having a surface layer polymer coating of at least one high performance polymer, and a prepared prepreg having surface layer polymer coating on one or both surfaces.

In another aspect, the invention relates to articles of manufacture made from the thermoplastic composites according to the invention described herein. Such articles are useful, for example, in the aircraft/aerospace industries among others.

In situ grade thermoplastic composite material tapes for use on an automated tape laydown or automated fiber placement machine are also provided.

These and other features and advantages of this invention will become apparent from the following detailed description of the various aspects of the invention taken in conjunction with the accompanying Figures and Examples.

DETAILED DESCRIPTION OF THE INVENTION

The present invention provides a prepared mold tool having a surface layer polymer coating applied to the release side mold surface of the mold tool to enhance adhesion of the first ply of thermoplastic fiber reinforced composite material to the mold surface.

Figure 1A:
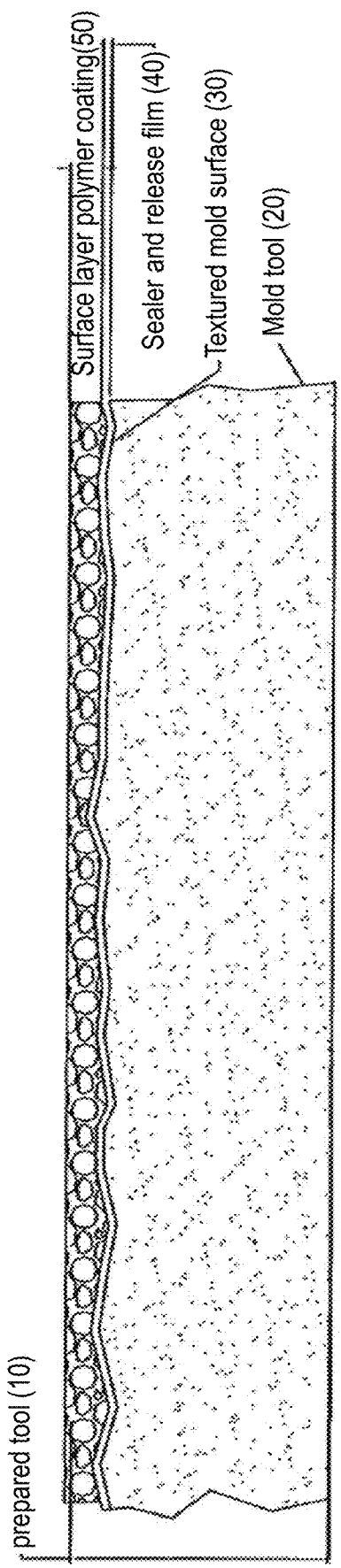
FIG. 1a is a side plan view of one embodiment of the present invention illustrating the configuration of the prepared tool (10) including the non-porous metal mold tool (20), the textured mold surface (30) of the mold tool, the release film (40) and the surface layer polymer coating (50).
Figure 1B:
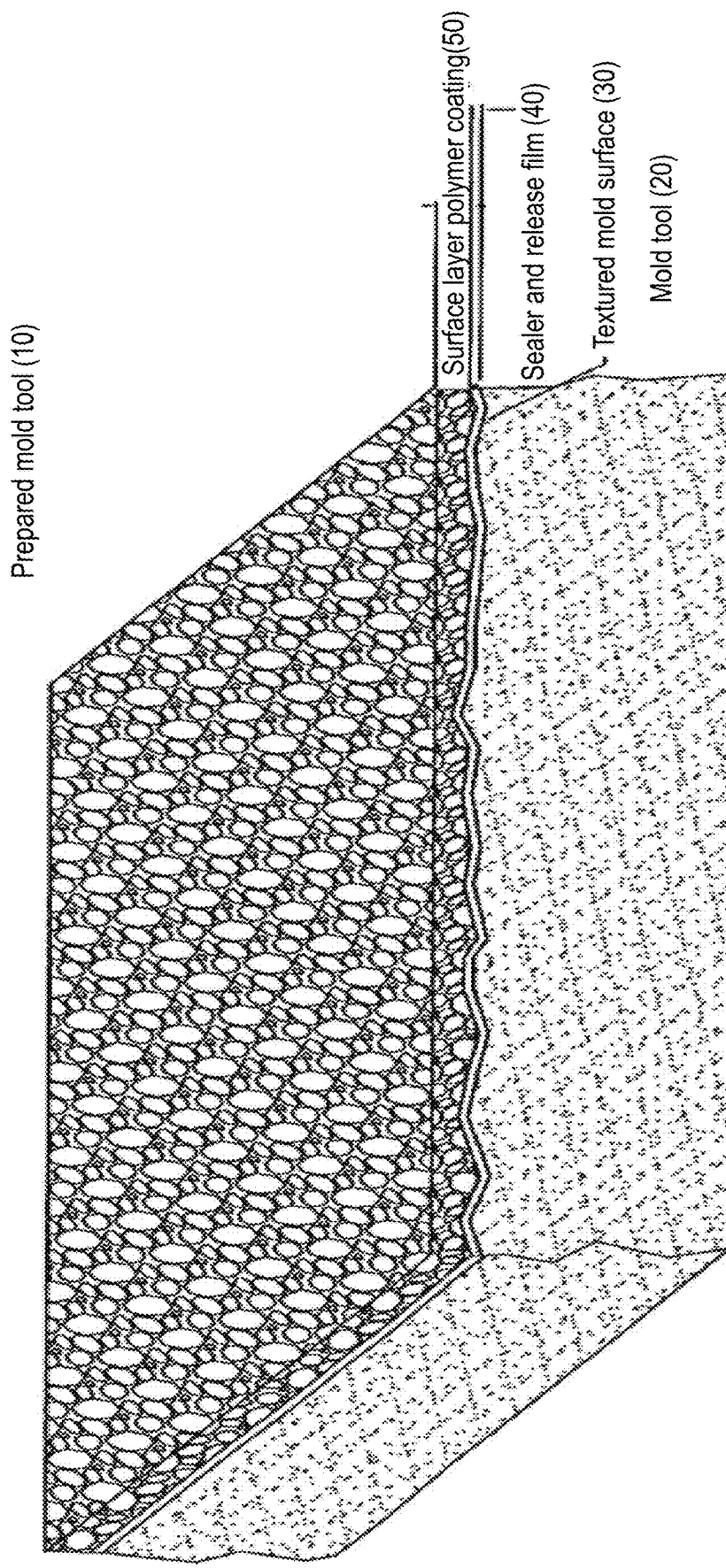
FIG. 1b is a perspective view of the embodiment of FIG. 1a illustrating the configuration of the prepared tool (10) including the non-porous metal mold tool (20), the textured mold surface (30) of the mold tool, a sealer and the applied release film (40) and the surface layer polymer coating (50) shown as substantially fused thermoplastic particles after application by plasma spraying.

FIG. 1a illustrates such an embodiment of the present invention providing the configuration of a prepared tool (10), including the non-porous metal mold tool (20) with a textured molding surface (30), a release film (40) and a surface layer polymer coating (50) releasably applied to the release film. FIG. 1b illustrates such an embodiment of the present invention providing the prepared tool (10) detailing the surface layer polymer coating (50) shown as substantially fused thermoplastic particles applied by plasma spraying.

Importantly, surface layer polymer coating (50) may be applied to the release side mold surface of mold tool (20) through use of plasma spray during in situ automated tape laydown. Continued plasma spray of the surface layer polymer during automated tape laydown on top of a prior ply of fiber reinforced composite material (60) provides a thermoplastic interlaminar layer (90) that can impart beneficial properties such as toughening to the resulting composite part.

Figure 2A:
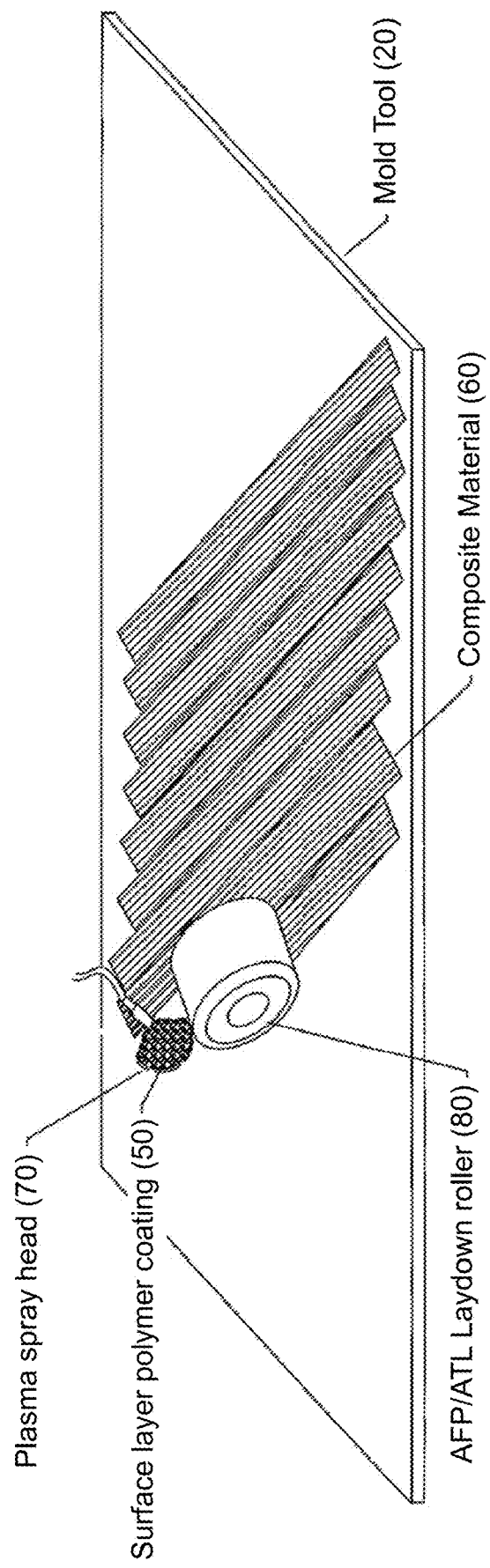
FIG. 2a illustrates a perspective view of in situ application of the surface layer polymer coating (50) from a plasma spray head (70) onto a non-porous metal tool (20) followed by application of a first ply thermoplastic fiber reinforced composite material (60) and compacted by an AFP/ATL laydown roller (80).

FIG. 2a illustrates in situ application of the surface layer polymer coating (50) such as thermoplastic particles from a plasma spray head (70) onto a non-porous metal mold tool (20) and then the application of thermoplastic fiber reinforced composite material (60) and compacted by an ATL laydown roller (80).

Figure 2B:
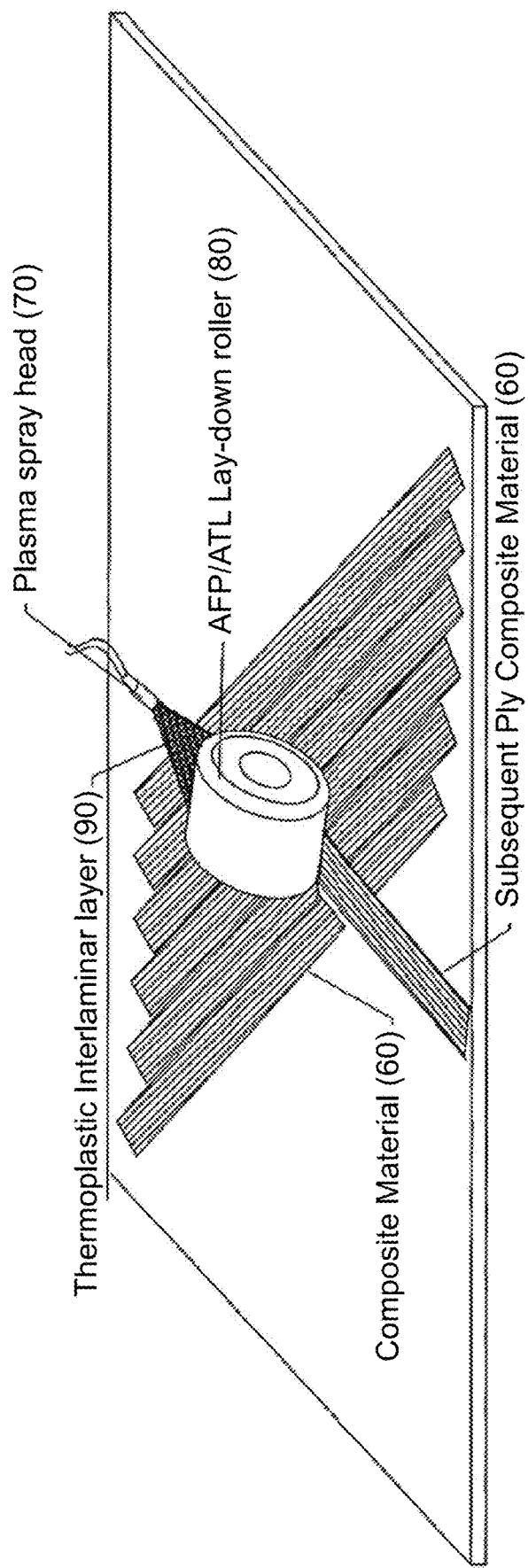
FIG. 2b further illustrates a perspective view of in situ application of the thermoplastic interlaminar layer (90) (e.g., thermoplastic particles) from a plasma spray head (70) onto a previously applied thermoplastic composite tape material (60) followed by application of a subsequent ply thermoplastic fiber reinforced composite material (60) and compacted by an AIL laydown roller (80) providing in situ applied thermoplastic interlaminar layer (90) between layers of thermoplastic fiber reinforced composite material during automated tape laydown.

FIG. 2b further illustrates continued plasma spray of the surface layer polymer by plasma spray head (70) during automated tape laydown thereby providing a thermoplastic interlaminar layer (90), and then application of a subsequent ply of thermoplastic fiber reinforced composite material (60) compacted by ATL laydown roller (80). Continued application of the surface layer polymer coating such as a thermoplastic from a plasma spray head (70) onto a previously ply of thermoplastic fiber reinforced composite material (60) and then a subsequent ply of thermoplastic composite material (60) applied and compacted by an ATL laydown roller (80) provides an in situ applied interlaminar thermoplastic layer (90) between the layers of thermoplastic fiber reinforced composite material and subsequently applied thermoplastic fiber reinforced composite material during automated tape laydown.

Thermoplastic interlaminar layer (90) and surface layer polymer coating (50) are each high performance thermoplastic polymers, and may be the same or different materials and may contain the same or different multifunctional additives. This versatility in selection of the particular high performance thermoplastic polymer permits selection of the optimal materials for the surface layer coating (50) and the interlaminar layer (90).

Similarly, the first ply fiber reinforced composite material (60) and the subsequent plies of fiber reinforced composite material (60) are each compatible material, but may be the same or different compositions depending upon the properties desired for each layer.

Alternatively, the present invention provides prepared prepreg having a surface layer polymer coating applied directly to one or more surfaces of a thermoplastic fiber reinforced composite prepreg material to enhance adhesion of the first ply of the thermoplastic fiber reinforced composite material to the mold surface of the mold tool and to further provide a beneficial interlaminar layer to the resulting composite part.

Figure 3:
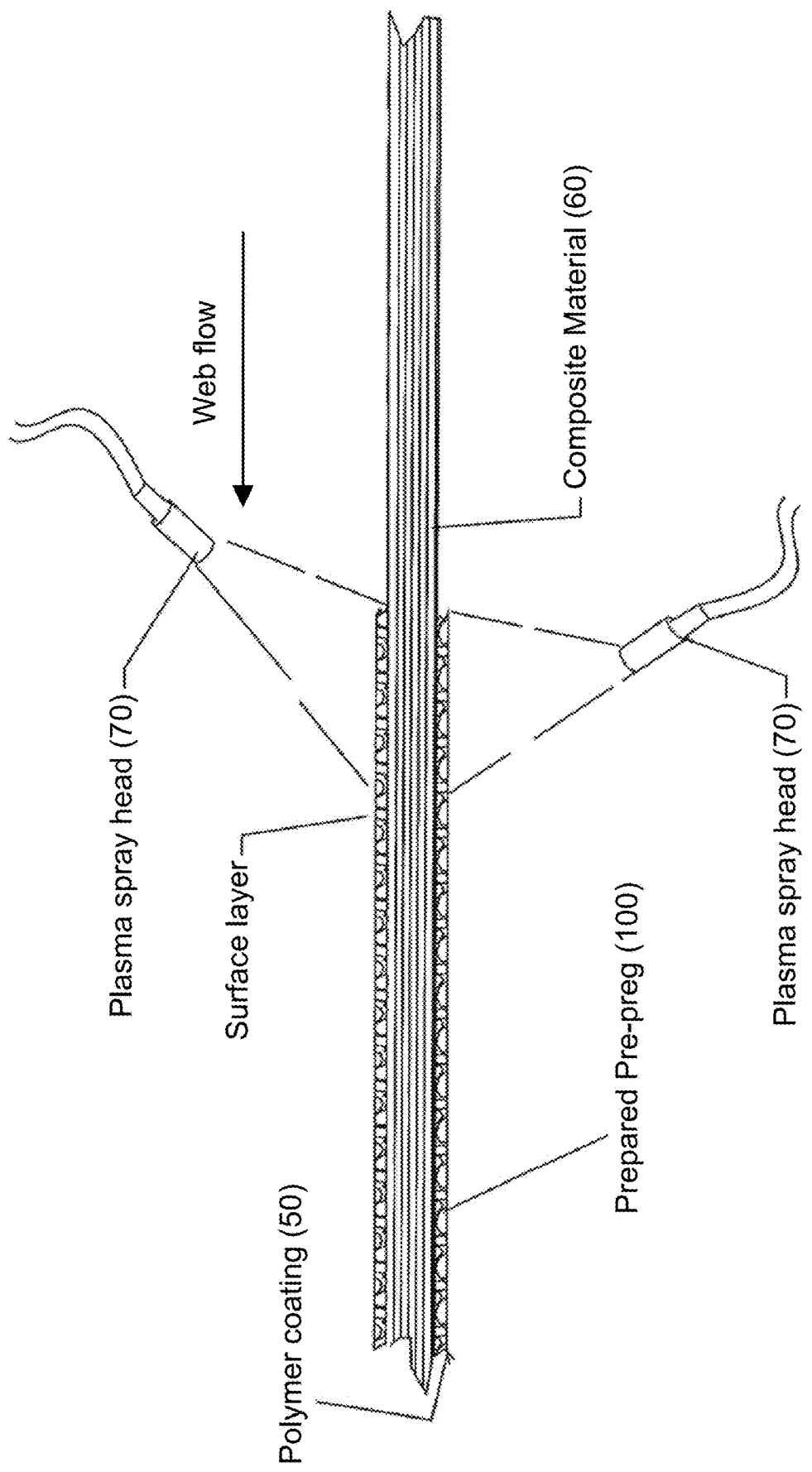
FIG. 3 illustrates a side plan view of a surface layer polymer coating applied to a thermoplastic composite prepreg by plasma spraying a thermoplastic polymer coating (50) from a plasma spray head (70) onto one or both surfaces of a composite material (60) to form a plasma coated thermoplastic composite material (100).
Figure 4A:
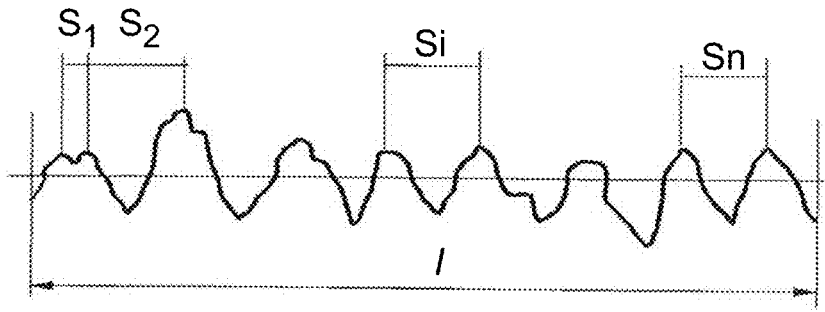
FIG. 4a illustrates the mean spacing of local peaks of profile of a high temperature mold tool and a thermoplastic surface layer polymer coating using a profilometer.
Figure 4B:
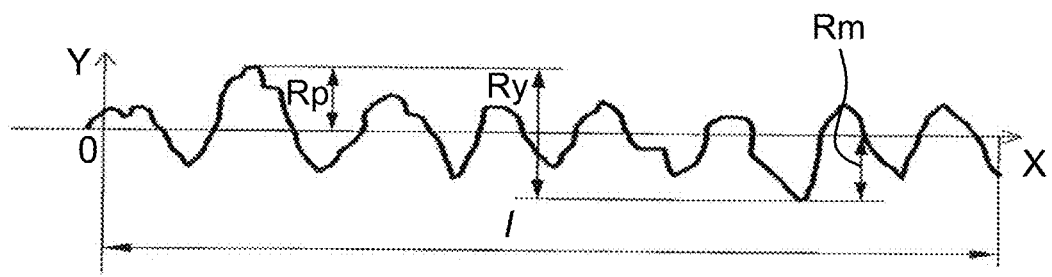
FIG. 4b illustrates the spacing of peaks in the y-axis.

FIG. 3 illustrates a prepreg (100) prepared by applying a surface layer polymer coating (50) to both surfaces of a thermoplastic fiber reinforced composite material (60) by plasma spraying thermoplastic particles from a plasma spray head (70) onto the surfaces of a fiber reinforced composite material (60), thereby forming the prepared prepreg (100). Depending upon the performance of the resulting composite part sought, the surface layer polymer coating may be the same or different on each side of the prepared prepreg (100).

Prepared tool (10) of the present invention incorporates a surface layer polymer coating (50) that is releasably adhered to the mold surface of a mold tool (20). Preferably, a release film (40) is interposed between the mold surface of the mold tool (20) and the surface layer polymer coating (50). Additionally, for optimal control of adhesion of the surface layer polymer coating (50) to the mold surface, the mold surface of the mold tool (20) is a textured surface (30). Prepared tool (10) may be utilized for laydown of fiber reinforced composite material by hand or by ATL as may be desired. Prepared tool (10) provides optimal controlled adhesion of the first ply fiber reinforced composite material during either hand or ATL application.

FIG. 2a illustrates laydown of a first ply fiber reinforced composite material (60) by automated tape laydown placement onto the mold surface of mold tool (20). When using a tape prepreg as the fiber reinforced composite material (60), a plasma spray head (70) will spray thermoplastic particles onto the mold surface, forming the surface layer polymer coating (50) on the mold surface for preparation of the mold surface of mold tool (20). Subsequently, an ATL laydown roller (80) lays down and releasably adheres the tape prepreg fiber reinforced composite material (60) onto the surface layer polymer coating (50) on the mold surface of the mold tool (20). Continued application of this process is illustrated by FIG. 2b wherein subsequent layers of fiber reinforced composite material (60) are applied by spraying thermoplastic particles onto the surface of a previously adhered layer of fiber reinforced composite material (60) using a plasma spray head (70), and then applying with the ATL laydown roller (80) a subsequent ply of fiber reinforced composite material to create a thermoplastic interlaminar layer (90). This thermoplastic interlaminar layer (90) can provide beneficial toughening or other multifunctional benefits as desired.

Prepreg (100) of the present invention is prepared by applying a surface layer polymer coating (50) to one or both surfaces of a fiber reinforced composite material (60) directly before or during in situ laydown of the fiber reinforced composite material (60). A flow of fiber reinforced composite material (60) is passed between one or more plasma spray heads (70) that apply surface layer polymer coating (50) to one or both sides of the composite material (60), thereby forming the prepared prepreg (100). This prepared prepreg (100) can then be directly applied to a mold tool or a prepared tool (10) by hand laydown or by ATL as desired, and is releasably adhered to the mold surface of the mold tool or prepared tool (10). Prepared prepreg (100) can be applied as a tape prepreg by an ATL laydown roller as shown in FIG. 2a, without the need for a separate plasma spray head (70) for applying a first ply of fiber reinforced composite material having a surface layer polymer coating (50) adjacent to the mold surface of the mold tool (20). The mold surface is preferably a textured mold surface (30). Prepared prepreg (100) can save manufacturing costs and create more uniform manufacturing conditions while providing the same potential multifunctional benefits. If the surface layer polymer coating (50) is applied to both surfaces of a fiber reinforced composite material (60), the coating (50) on each surface can have the same or different compositions.

Various methods of applying surface layer polymer coating (50) are available and known in the art, such as by spraying a solvent based polymer solution onto the mold surface of a metal mold tool, by hand applying a water based slurry, by a plasma spray application, or an electrostatic powder coating and fusing method, among others.

One particularly preferred embodiment of the present invention provides for plasma spray application of the surface layer polymer onto the mold surface of a mold tool (20) forming a prepared tool (10) as illustrated in FIGS. 1a and 1b, or directly onto the fiber reinforced composite material (60) as depicted in FIG. 3 to form prepared prepreg (100). When the surface layer polymer coating (50) is applied using a plasma spray gun, the surface layer polymer is introduced to the plasma gun in the form of solid particles, preferably thermoplastic particles with a $D_{90}$ diameter (wherein ninety percent of the particles are smaller, than the number, by volume) from 90 to 180 μm and more preferably from 150 to 185 μm. The particles are applied using a low velocity, high temperature plasma.

A preferred high performance polymer surface layer polymer particle is PEEK polymer.

Surface layer polymer coating (50) is substantially continuous, but may be discontinuous at lower thickness levels along the mold surface, especially depending upon the level of roughness of textured surface (30) to which it is applied. It is desired to be continuous over at least 50% of the mold surface, and more preferably at least 90% of the mold surface and optimally, at least 98% of the mold surface. When utilizing a plasma spray head (70) to apply the surface layer polymer coating (50), the heated thermoplastic particles impact and adhere to the mold surface as molten particles and the resulting surface layer coating (50) can appear as a discontinuous plurality of beads that are well fused thermoplastic particles, but not all are melt fused together, forming the partially discontinuous film.

The high performance polymer particle size is $D_{90}$ of about 100 μm to about 400 μm. Preferably, the polymer particle sizes is in the $D_{90}$ range of from about 125 μm to about 250 μm, and most preferably from about 150 to about 200 μm for optimum plasma spray application results. When applied, the high performance polymer particles are exposed to a plasma spray head temperature in the range of about 1800° F. to about 2000° F. at a velocity of about 350 to about 400m/second at the vent port nozzle section of the plasma spray applicator.

Useful commercially available plasma spray applicator include the Praxair SG 10 plasma spray applicator or a Sulzer Metco plasma spray applicator. The high performance polymer is introduced into the plasma spray head as a solid particle. The plasma spray applicator then directs the solid particles into the plasma jet stream to heat and accelerate the particles to a high velocity.

For best performance, the mold tool (20) is pre-heated to about 250° F. (121° C.) to aid in adhering the surface layer polymer coating (50) to the mold surface of the mold tool (20).

For preparation of a prepared mold tool, plasma spraying should apply surface layer polymer coating (50) to the mold surface of the mold tool (20) at a thickness in the range from 0.001 to 0.010 inch thick layer. In some embodiments, the thickness of the surface layer polymer coating (50) is more preferably about 0.002 inches. This thickness is intended to aid in adhesion of the first ply without adding significant weight to the resulting composite part.

In preparing a prepared prepreg (100), plasma spraying should apply a surface layer polymer coating (50) onto a fiber reinforced thermoplastic composite material (60) at a thickness of from about 0.0005 to about 0.010 inches per layer. In some embodiments, the thickness of the surface layer polymer can be from about 0.001 to about 0.008 inches per layer.

Surface layer polymer coating (50) can be releasably applied to the mold surface of mold tool (20) to allow effective release of the resulting composite part from the mold surface of the mold tool. While a difficulty with automated tape lay-down of thermoplastic fiber reinforced composite materials is ineffective adhesion of the first ply to the mold surface of the mold tool, the thermoplastic surface layer polymer coating should not adhere so strongly to the mold surface of the mold tool so that when removal is attempted, the thermoplastic surface layer polymer coating is compromised and the resulting thermoplastic composite part is damaged. This is especially important when the thermoplastic surface layer polymer coating contains any multi-functional agent such as described herein to further enhance the surface properties of the resulting thermoplastic composite part.

For purposes of this invention, the thermoplastic surface layer polymer coating is said to be releasably applied when the resulting thermoplastic composite part made on a mold tool with a thermoplastic surface layer polymer coating releases from the mold tool with slight to modest pressure, while the surface layer polymer coating does not detach during the automated in situ laydown of the thermoplastic fiber reinforced composite material.

The thermoplastic surface layer polymer (50) on the mold surface of mold tool (20) can improve the surface quality and properties of the resulting thermoplastic composite part once it is removed from the mold tool due to the qualities of the resin rich thermoplastic surface layer polymer coating, the enhanced surface texture, and optional multi-functional additives which can be incorporated therein.

The surface layer polymer coating (50) can comprise a high performance polymer chosen from a slow crystallizing, semi-crystalline polymer or an amorphous polymer (or mixtures thereof), such that the thermoplastic surface layer polymer coating (50) forms a miscible and/or compatible blend with the high performance thermoplastic polymer of the fiber reinforced thermoplastic composite material (60). The surface layer polymer coating (50) can be any one of the high performance thermoplastic polymers described herein that is applied to the mold surface of mold tool (20) for improved processing of first ply laydown as described herein or applied directly to one or both surfaces of thermoplastic fiber reinforced composite material (60) before application to the mold tool.

The morphology of the high performance thermoplastic polymer can be amorphous and/or a slow crystallizing (i.e., low crystallinity typically less than 20% crystallinity) semi-crystalline polymer. Blends of amorphous and semi-crystalline polymers are also contemplated for use as the surface layer polymer coating (50). In certain embodiments, the high performance thermoplastic polymer for thermoplastic surface layer polymer coating (50) is chosen from polyaryletherketones (PAEK), polyetherimide (PEI), polyimides, PAEK co-polymer with PEI and/or polyethersulfone (PES) and/or polyphenylenesulfide (PPS), and PAEK blends with one or more of PEI, PES, PPS and/or polyimides.

In particular embodiments, for example, thermoplastic surface layer polymer coating includes PAEK chosen from polyetheretherketone (PEEK) or polyetherketoneketone (PEKK) and blends with, such as, but not limited to, diphenylsulfone. When the thermoplastic surface layer polymer includes PEKK, the T:I ratio of the PEKK ranges from about 0:100 to about 70:30 in order to maintain the slow crystallization rate of the surface layer polymer. In a particular embodiment, the T:I ratio of the thermoplastic surface layer polymer uses CYPEK® DS that has a T:I ratio of from about 0:100 to about 70:30. Suitable PEKK polymers available for use with the present invention include, but are not limited those commercially available from Cytec Industries Inc., Woodland Park N.J., such as CYPEK® DS-E or CYPEK® DS-M and CYPEK® HT.

The surface layer polymer coating (50) can further include one or more multi-functional agents chosen for improving the resulting thermoplastic composite part features, such as electrical conductivity, toughness, oxygen permeability, crystallization rate and/or solvent resistance of the resulting thermoplastic composite part. Such multi-functional agents may be in the form of a metallic coating and/or micro-and/or nano-particles.

The optional surface layer polymer coating (50) multi-functional agents can include one or more of materials such as, but not limited to, impact modifiers, mold release agents, lubricants, thixotropes, antioxidants, UV absorbers, heat stabilizers, flame retardants, pigments, colorants, layered colorants for impact damage indicators, nonfibrous reinforcements and fillers, nano-graphite platelets, to enhance crystallinity rate and mitigate shrinkage, nano-clays to improve solvent resistance, nano-metals (such as nickel fibrils), particle interleaving for impact toughening, CVD veil fabrics in interleave for OML lightning strike, fiber or polymer veils to improve impact performance, surface finishes to aid in air removal as the pressure is applied by the ATL machine, and high flow surface coatings to speed reptation healing across the inter-ply region.

The mold tool (20) can be of any non-porous high temperature tooling including metal. Metal tooling, preferably stainless steel, invar or low carbon steel as known to one skilled in the art are all appropriate. The mold surface of the mold tool (20) can be stainless steel able to withstand the high processing temperatures required for thermoplastic fiber reinforced composite part manufacturing and low CTE, but is preferably invar. High temperature tooling is capable of withstanding processing temperatures up to 800° F. (427° C.). Mold tool (20) can be a 0.120" thick 304 stainless steel plate or 0.063" invar 36. However, the stainless steel plate may not be as effective as invar due to higher differential CTE, which can cause delamination during processing of the thermoplastic fiber reinforced composite material from the mold surface of the mold tool.

The mold tool (20) should be a solid, impermeable material that is non-porous. The mold tool (20) should not allow the flow of air or gases through its mold surface.

A textured mold surface (30) is preferably created on the mold surface of the mold tool (20) in order to improve mechanical adhesion of the surface layer polymer (50) to the mold tool (20) in an effort to overcome the CTE differential delaminating the thermoplastic fiber reinforced composite material (60) and surface layer polymer coating (50) from the mold surface of mold tool (20). The textured mold surface (30) is believed to provide a mechanical interlock between the mold tool (20) and the surface layer polymer coating (50), as well as improve adhesion in order to overcome differences in coefficient of thermal expansion between the surface layer polymer coating (50) and the mold tool (20). Too little texture and the mechanical interlock will be insufficient to overcome the CTE differential, resulting in the surface layer polymer coating (50) easily peeling off of the mold tool (20) during manufacture. Too coarse of a textured mold surface (30) can result in a surface layer polymer coating (50) that can be difficult to release and remove without causing damage to the surface layer polymer coating (50) when trying to remove the resulting composite part from the mold tool.

The textured mold surface (30) can be added by many means such as sandblasting, milling, Blanchard grinding, glass bead blasting, knurling, or other means to texture the mold surface to accept the release film (40). Creation of the textured mold surface (30) can be accomplished by a method such as sandblasting with a grit size from about 20 grit to about 180 grit, and more preferably 40 grit to 120 grit. In particular, about 120 grit aluminum oxide or about 40-60 grit glass beads provide an even texture on the surface and are preferred with the 40-60 grit glass beads being optimal. The preferred methods of applying an appropriate texture is by sandblasting with 120 grit aluminum oxide or 40-60 grit glass beads.

The appropriate texture for a particular combination of mold surface of a mold tool (20) and surface layer polymer coating (50) can be optimized by one skilled in the art to identify the most appropriate level of texture for a particular surface layer polymer coating (50) and mold tool (20). One skilled in the art will be able to identify the most appropriate level of texture for the type of mold tool material and surface layer polymer coating material to overcome the CTE differences involved to support sufficient adhesion while maintaining releasability of the resulting composite part.

One method of quantifying an appropriate level of texture is by measuring the profile elements of a textured mold surface (30). Both a greater mean spacing of profile elements and greater depth of profile elements are appropriate methods of distinguishing preferred levels of texture. Both profile elements need to be appropriate for the texture to be appropriate.

A high temperature mold tool and a thermoplastic surface layer polymer coating, a 0.063" invar 36 sheet with a PEKK surface layer polymer coating, was tested with a Time Group Inc. TR200 diamond stylus tip surface profilometer, inductance type surface roughness tester. The surface profilometer uses a diamond stylus that is moved at a controlled speed over the surface of the sample to detect characteristics of the material. These parameters are measured on a flat sample by resting the device on top of the sample. This is test is performed at standard room temperature and humidity and the mold tool tested should be at room temperature. The profilometer is set onto the sample in the x-direction (defined as parallel to the edge of the test bench) and the test is begun using the play arrow key and all parameters are recorded for the X-direction. The profilometer is then repositioned perpendicular to the previous test and the test is repeated to record all parameters for the Y-direction.

This Rsm calculation is illustrated in Formula 1, with $R_Y$ illustrated in Formula 2, As seen in Table 1 below, a combination of maximum peak-to-peak measurement profile height was found to be the best characteristic of optimal texture. Values greater than those shown in Table 1 may be obtained and used. However, greater values may adversely increase mechanical adhesion, impact resulting composite part dimension, and distort tolerances.

TABLE 1

| (Micro Meters) Tool finish Direction | Description | Stainless Steel Smooth | 120 grit AlO$_2$ | 40-60 glass | Invar 36 40-60 Glass X | Mill scale X | Y | 120 grit AlO$_2$ X1 | X2 | X3 | Y |
|---|---|---|---|---|---|---|---|---|---|---|---|
| Rsm | mean spacing of profile elements | 0.160 | 0.114 | 0.093 | 0.167 | 0.200 | 0.182 | 0.070 | 0.071 | 0.068 | 0.067 |
| $R_Y$ | Maximum height of profile | 1.391 | 4.707 | 7.28 | 6.255 | 7.059 | 6.664 | 7.288 | 7.084 | 7.032 | 5.947 |

The mold release film (40) can be applied to the mold surface of mold tool (20) after applying textured mold surface (30) to the mold tool to evenly and uniformly cover the mold surface of the mold tool (20). The mold release film (40) further provides the appropriate releasable adhesion of the surface layer polymer coating (50) to the mold surface of the mold tool (20). The mold release film (40) may only partially cover the textured mold surface (30) of the mold tool (20), so long as it covers that recommended by the mold release manufacturer.

The mold release film (40) functions as an interface between the textured mold surface (30) of the mold tool (20) and the surface layer polymer coating (50). The mold release film (40) also provides a chemical bonding to restrain the surface layer polymer coating (50) on the mold surface, thereby maintaining optimal adhesion and subsequent releasability of the surface layer polymer coating to the mold surface during application of the thermoplastic fiber reinforced composite material. The mold release film (40) is also robust enough to survive the intense heat and conditions from the laydown process such that it provides a release layer to separate the surface layer polymer coating (50) from the mold tool (20) once the resulting composite part has been cured.

Mold release film materials are commercially available and are advertised as capable of releasing the product from a mold tool after processing, Suitable commercial mold release film include Hysol Frekote 800, AXEL 21RM, AXEL 21LS, and AXEL W-4005. The release agent is preferably high temperature AXEL W-4005 applied and seasoned per the manufacturer's specifications.

The mold tool (20) together with the mold release film (40) can then be heated to "season" as recommended by the supplier.

A sealer can optionally be applied to the mold surface of mold tool (20) as recommended by the mold tool manufacturer prior to application of the mold release film (40) to further increase the releasable adhesion of the surface layer polymer coating (50) and allow release of the resulting composite part from the mold surface.

Fiber reinforced composite material (60) are structural reinforcement fiber materials, pre-impregnated with an appropriate high performance thermoplastic polymer matrix resin. These are generally categorized as tape, woven cloth, non-woven cloth, paper, and mixtures thereof.

Suitable structural reinforcement fibers for fiber reinforcement include any of the commercially available structural fibers such as carbon fibers, Kevlar® fibers, glass fibers, aramid fibers, and mixtures thereof. In a preferred embodiment the fibrous structural reinforcement fiber is a polyacrylonitrile (PAN) based carbon fiber.

The fibrous structural reinforcement can be configured in a unidirectional tape (uni-tape) web, non-woven mat or veil, fiber tow, or fabric material. Tape prepreg generally refers to unidirectional structural reinforcement fibers that extend along a single axis of the strip material. Tape prepreg is generally used for ATL laydown applications. The term "cloth" generally refers to structural reinforcement fibers laid along at least two different axes within the strip material. Cloth is commercially available as bi-axial, tri-axial and quad-axial, indicating fibers extending in two, three, or four different axes, respectively. The fibers may optionally be woven with one another, or may be manufactured as non-woven cloth. Cloth prepreg materials are generally used for hand laydown applications.

Fiber reinforced composite material (60) contains any of the fibrous structural reinforcement fiber described herein that has been impregnated with at least one high performance thermoplastic polymer via any manufacturing/impregnation method known to those of skill in the art. Suitable impregnation methods are known to those of ordinary skill in the art and include, for example and without limitation, hot-melt impregnation, aqueous slurry impregnation, powder coating, extrusion film lamination, and combinations thereof.

The high performance thermoplastic polymer for the surface layer coating (50) and the high performance thermoplastic polymer as the matrix resin for the fiber reinforced thermoplastic composite material (60) can be the same or different materials or combinations thereof.

The term "high performance polymer" is meant to refer to any thermoplastic polymer that has a melting temperature (Tm) greater than or equal to 280° C. and a process temperature (Tprocess) greater than or equal to 310° C. In certain embodiments, the higher performance polymer is chosen from polyaryletherketones (PAEK). PAEK blends, polyimides, and polyphenylenesulfides (PPS).

In certain embodiments, the PAEK is chosen from polyetheretherketone (PEEK), polyetheretherketoneketone (PEEKK), polyetherketoneketone (PEKK), polyetherketone (PEK), and polyetherketoneketoneetherketone (PEKKEK). In still other embodiments, the high performance polymer is a PAEK blend having polyetherimide, polyphenylene sulfide and/or polyethersulfone mixed in with one or more polyaryletherketones.

Polyaryletherketones are well known to those skilled in the composite arts and include, but are not limited to, APC-2® PEEK, CYPEK®-FC and/or CYPEK®-HT, all commercially available from Cytec Industries Inc., Woodland Park, N.J.

Resin content of the high performance thermoplastic polymer resin in the fiber reinforced composite material (60) ranges from about 26% to about 90% by weight of the total thereby providing composite material (60) with a resin modulus of 500 ksi or greater and an interlaminar fracture toughness of 600 J/m$^2$ or greater as measure by $G_{1c}$. The viscosity of the high performance polymer is adjusted so that good filament wet out is obtained. Ultimately, the high performance polymer of the fiber reinforced composite material acts as part of a polymer matrix and forms a polymer blend with the surface layer polymer coating (50) when the materials are contacted. As used herein, the term "polymer blend" includes miscible and compatible polymer blends as those terms are known and understood by those skilled in the art to which the invention pertains.

The resulting thermoplastic composite parts formed by the present invention can be various articles formed using rapid lamination and forming processes including, but not limited to, in situ thermoplastic tape/tow placement for stiffened wing and fuselage skins, continuous compression molding (CCM) and roll forming process for stiffener fabrication, double belt press to make consolidated flat panels and aircraft floor panels, in situ filament wound cylindrical structures, and fusion bonding and welding of composite assembly.

The following examples are provided to assist one skilled in the art to further understand certain embodiments of the present invention. These examples are intended for illustration purposes and are not to be construed as limiting the scope of the various embodiments of the present invention.

EXAMPLE 1

Solvent Based PEI Polymer Sprayed Solution Applied to Tool

A formulation of PEI polymer, GE Ultem 1000 P at 10% plus Dioxilane at 90% was plasma sprayed onto the mold surface of a steel mold tool which had a release film using an HVLP applicator.

To test the transfer of the PEI/Dioxilane first ply lay-down fiber reinforced thermoplastic composite, an 8 ply quasi-isotropic panel was created using APC PEKK/AS-4 uni-tape material. The panel was processed with a caul plate at an autoclave temperature of 720° F. (382° C.) and 100 psi of $N_2$. The panel showed some surface anomalies on the coated face.

EXAMPLE 2

Water Based Slurry Hand Applied to Tool

A direct hand application technique was attempted using a mixture that included surfactant, water, hydrosize (sizing) and thermoplastic, as follows: 1) Sizing 90%/PEKK 10%. 2) D.I water 80%/Surfactant 10%/PEI-Diox. Premix solution 10%. 3) D.I water 80%/Surfactant 10%/PEKK 10%. 4) Sizing 80%/PEI powder 10%/Surfactant 10%). The resulting water based slurry therrnoplastic surface layer polymer coating shrank rapidly on the mold surface of the mold tool and did not achieve adequate bonding onto metal mold tool. The surface layer polymer coating flaked off very easily with minimum abrasion.

EXAMPLE 3

PEK Polymer Plasma Sprayed Onto Mold Tool

To impart a coating directly onto the mold surface of a mold tool applied with a sealer and release film, a plasma spray coating was performed using a Praxair SG 100 plasma gun and introduced PEK polymer into the jet stream to heat and accelerate the material to high velocity. Initially there was difficulty maintaining adhesion between the sealed/ released tool and the PEK polymer, when the tool was allowed to cool to room temperature, likely caused by the difference in CTE (coefficient of thermal expansion) of the mold tool and the thermoplastic surface layer polymer coating on the smooth mold surface of the mold tool. It appeared that the skin coating released from the tool (Hysol® Frekote® GP sealer agent and release agent Frekote® 800).

EXAMPLE 4

PEK Polymer Plasma Sprayed Onto Textured Mold Surface of Mold Tool

To improve adhesion of the plasma PEK polymer spray, a subsequent panel was sandblasted using 120 grit aluminum oxide and release coated with Frekote® 800. A much better coating application was achieved.

To test how the PEK plasma-sprayed coatings transferred to a laminate, two 8-ply quasi-isotropic panels were created using APC PEKK/AS-4 uni-tape material. The panels were processed with a caul plate at an autoclave temperature of 720° F. (382° C.) and 100 psi of $N_2$.

The resulting panels showed some uneven surface texture and surface layer polymer coating thickness. Some areas of the surface coating could be scraped off the resulting thermoplastic fiber reinforced composite part. The mold surface of the mold tool was clean after the autoclave cycle, indicating the mold release was effective.

EXAMPLE 5

Plasma PEK Polymer Sprayed Coating Onto Prepreg

Plasma spraying was also conducted on APC-uni-tape samples to provide a path to adding material to the outside of a thermoplastic material. Two coated weights were deposited to test the process control. Only one side of the tape was coated. Transverse resin shrinkage and wrinkling of the tape was noted.

The unique capabilities of this process offer beneficial uses such as combinations of materials including ceramic, metallic and polymer blends that would be difficult to produce by other means. Metal alloy coatings may provide improved electrical conductivity for lightning strike and edge glow reduction.

EXAMPLE 6

Thermoplastic composite parts are processed at high temperatures and require stable tooling materials. The processing cycle for PEKK-FC uni-tape panels exceeds 730° F. (388° C.) which necessitates steel alloy tooling. For this series of experiments the tooling was 0.120" thick 304 stainless steel plate.

Multiple surface finishes were tried during this experiment. The default smooth panel was a 0.125" thick stainless steel plate that had been sanded with 120 grit sandpaper and solvent cleaned. The textured surface treatments used included 120 grit aluminum oxide and 40-60 c grit glass bead blasting. These surfaces increased the mechanical locking of the first-ply coating to the release-coated material. It is believed that the surface also broke up the resin film by creating thick and thin areas that reduce the effect of the resin shrinkage on tool adhesion. The glass-bead blasted tool is recommended for plasma spraying but had not yet been tried. The benefit of the texture is that it aids retention of the coating during processing.

Zyvax Sealer GP was initially used to seal the stainless plates. This was found to interact with the Frekote® 800 to produce a surface with an exceptionally easy release. This causes premature slip of the coating on the tool. After this was discovered, the sealer was mechanically removed from all surfaces and discontinued.

The first mold release evaluated was Hysol® Frekote® 800. This solvent-based system is known to offer release at processing temperatures above 400° C. The release was wiped onto the stainless steel surface and allowed to air dry, and then the tools were plasma sprayed with thermoplastic. Initial coating used the PEI/dioxilane spray and showed a tendency to peel off the tool with minimal abrasion. Kant-Stik Cure-Fast mold release was then tried and was also found to have an easy-release surface. This release has proven difficult to process above 750° F. (399° C.).

AXEL 21RM mold release was then used without a sealer and appeared to have a "tighter" surface than any of the previous releases. It is a solvent-based system. The Axel 21RM is the preferred available release for this application. It works without a sealer to provide good surface adhesion without being too slippery. A water-based version, W4005, was also tried to compare to the AXEL 21RM, but found to be sensitive to abrasion with small "marbles" of release evident after some finger abrasion of the tool.

In keeping with the release manufacturer's recommendations, the tools were heated to the use temperature (735° F., 391° C.) to season the release onto the tool. Seasoning the tool allows the release to be cured onto the tool before entering service. This step was included to prevent solvent from the first ply laydown using the PEI/dioxilane solution from lifting the mold release film.

EXAMPLE 7

To impart a coating directly onto a release-coated tool, a plasma spray coating was performed using a plasma gun and introduced PEK polymer into the jet stream to heat and accelerate the material to high velocity. The PEK polymer is fed to the plasma gun using a fluidized bed feeder system.

This time the tool was pre-heated to 250° F. (121° C.) to aid in adhering the polymer to the surface of the tool. A Praxair SG 100 plasma gun was used to deposit approximately 2 mils of PEK polymer on to the tool. This temporarily deposits the powder onto the tool. The stainless steel tools with the powder coating were then processed in an electric furnace at 750° F. (399° C.) to melt the polymer and create a melted polymer layer.

To improve adhesion of the plasma spray, a subsequent panel was sandblasted using 120 grit aluminum oxide and release coated with Hysol® Frekote® 800. A picture frame of tape was placed on the tool to create a rough center panel and a smooth perimeter. This picture frame was intended to show the effect of surface roughness transitions on the first ply lay-down materials. This also provides a smooth area for masking off tool overspray.

To test how the PEK plasma-sprayed coatings transferred to a laminate, an 8-ply quasiisotropic panel was created using APC PEKK/AS-4 uni-tape material. The panel was processed with a caul plate at an autoclave temperature of 720° F. (382° C.) and 100 psi of $N_2$. The resulting panel showed somewhat un-even texture and coating thickness. The coated tool surfaces were clean after the autoclave cycle, indicating the mold release was effective.

Film Lamination using bi-or tri-layer in situ thermoplastic tape: A small press was heated to between 290° C. and 410° C. Kapton film is coated with a release agent and, with the press at the desired temperature; a bi-or tri-layer configuration is sandwiched between two pieces of the release agent coated Kapton film, thereby forming a lay-up. The lay-up is placed between the two 3"×3" stainless steel caul plates of the press along with a thermocouple. The stack is inserted into the press and 1,000 pounds of pressure is applied and held for a period of from 10 to 30 seconds. The pressure and top plate is then released and the stack is removed to cool under a cold press (1000 lbs. for 1 minute).

In view of the above description and examples, one of ordinary skill in the art will be able to practice the disclosure as claimed without undue experimentation.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

We claim:

1. A method of automatically laying down layers of thermoplastic composite material, the method comprising:
   a) providing a non-porous mold tool having a textured mold surface;
   b) applying a release film to the textured mold surface of the mold tool;
   c) plasma spraying thermoplastic polymer particles on the release film to form a thermoplastic surface layer of discontinuous substantially fused thermoplastic particles releasably adhered to the release film, the thermoplastic surface layer being formed discontinuous due to a level of roughness of the textured mold surface, and said thermoplastic polymer particles being formed of polyaryletherketones (PAEK) or PAEK blended with one or more of polyetherimide (PEI), polyethersulfone (PES), polyphenylenesulfide (PPS), and polyimides;
   d) automatically laying down a first layer of thermoplastic fiber reinforced composite material on the thermoplastic surface layer, said first layer of thermoplastic fiber reinforced composite material comprising reinforcement fibers impregnated with a thermoplastic polymer selected from polyaryletherketones (PAEK) and PAEK blends comprising PAEK mixed with polyetherimide, polyphenylene sulfide, or polyethersulfone;
   e) plasma spraying additional thermoplastic polymer particles on an exposed surface of the first layer of thermoplastic fiber reinforced composite material to form a thermoplastic interlaminar layer, said additional thermoplastic polymer particles being formed of polyaryletherketones (PAEK) or PAEK blended with one or more of polyetherimide (PEI), polyethersulfone (PES), polyphenylenesulfide (PPS), and polyimides; and
   f) automatically laying down a subsequent layer of thermoplastic fiber reinforced composite material on the thermoplastic interlaminar layer, said subsequent layer of thermoplastic fiber reinforced composite material comprising reinforcement fibers impregnated with a thermoplastic polymer selected from polyaryletherketones (PAEK) and PAEK blends comprising PAEK mixed with polyetherimide, polyphenylene sulfide, or polyethersulfone.

2. The method according to claim 1, wherein the textured mold surface is created by sandblasting using glass beads with grit size of 40 to 120 grit.

3. The method according to claim 1, wherein the reinforcement fibers in each of the layers of thermoplastic fiber reinforced composite material are unidirectional fibers.

4. The method according to claim 1, wherein the reinforcement fibers in each of the layers of thermoplastic fiber reinforced composite material are selected from the group consisting of: carbon fibers, glass fibers, aramid fibers, and mixtures thereof.

5. The method according to claim 1, wherein the thermoplastic polymer particles in step (c) have a diameter $D_{90}$ size of 90 to 180 μm before the plasma spraying.

* * * * *